United States Patent

Norton, Jr.

[15] 3,693,427

[45] Sept. 26, 1972

[54] SHAPE CONTROL SENSOR FOR COLD ROLLING MILLS

[72] Inventor: Allyn S. Norton, Jr., Charlottesville, Va.

[73] Assignee: General Electric Company

[22] Filed: Dec. 23, 1970

[21] Appl. No.: 100,973

[52] U.S. Cl. .................................. 73/144, 73/159
[51] Int. Cl. .............................................. G01l 5/04
[58] Field of Search .................... 73/88 R, 144, 159

[56] References Cited

UNITED STATES PATENTS

| | | | |
|---|---|---|---|
| 2,809,519 | 10/1957 | Kaestner | 73/144 X |
| 3,611,764 | 10/1971 | Asano | 73/159 X |
| 2,728,223 | 12/1955 | Herrman | 73/144 |

Primary Examiner—Jerry W. Myracle
Attorney—John J. Kissane, James C. Davis, Jr., Frank L. Neuhauser, Oscar B. Waddell and Joseph B. Forman

[57] ABSTRACT

An apparatus for sensing "shape" of a strip in processing by a rolling mill including two or more rolls over which the strip is passed between successive stands of the mill, each roll being journaled at each end and each journal being supported by a load cell for measuring the force exerted by its roll and differentiating circuits for receiving the measured forces for determining the "flatness" of the strip and therefrom correcting or adjusting the parameters of the mill stands. In its simplest form one of the rolls is provided with a convex crown, and in a more sophisticated version of the invention the apparatus includes two crowned rolls, one roll being convex and the other being concave.

10 Claims, 13 Drawing Figures

INVENTOR.
ALLYN S. NORTON, JR.

SHAPE CONTROL SENSOR FOR COLD ROLLING MILLS

BACKGROUND OF THE INVENTION

In processing metal strip through a cold rolling mill the thickness of the reduction is controlled both by the rolling force between the work rolls and the tension in the strip, and the ultimate thickness of the strip after rolling may be exceedingly less than the width of the strip. Normally the cold rolling process operates so that each section of the strip is elongated an equal amount and the tension stress in the strip across its width is uniform. However, under certain conditions the tension at the edges of the strip may become greater than the tension at the center of the strip causing greater elongation at the edges than at the center. Under these conditions although during rolling the strip may appear to be flat, when the strip is unrolled it will not be found to be flat-in some instances the edges may even become curled.

Similarly, when the tension at the center of the strip is greater than that at the edges, the strip will not be flat after rolling, but may buckle in the center.

In respect to the foregoing it is to be pointed out that "shape" in respect to a strip of material such as steel also may be considered to be the thickness profile of the strip across its width; however, in the present invention "shape" is defined as "flatness" of the strip with respect to a plane surface.

Although the reasons behind the phenomenon of strip curling and buckling are not thoroughly understood, it appears that their causes are related to surface tension, which in solids is much more difficult to measure than in liquids apparently because solids have greater ability to support shear stress whereas in liquids the molecules are mobile and under stress rearranged themselves so that the surface tension of a liquid is constant over its entire surface, as exemplified by liquid drops being spherical.

As noted above, the two major strip "shape" problems are curled or wavy edges and full or buckled centers. It is well established also that these problems arise from uneven tension in the strip during the rolling process; and that in order to remedy the situation it is necessary to determine the tension in the strip during the rolling process, measuring not only total tension but also differential tension between the edges of the strip and tension values of the center of the strip. Modern metals rolling mills frequently are controlled by automatic computers and the like; and under automatic operation the control of strip shape can be accomplished by judicious adjustments such as "roll bending," "solution flow," "mill drafting" and "mill speed." In order to make such adjustments, however, it is essential that accurate determination of strip tensions be made as indicated above.

SUMMARY OF THE INVENTION

The present invention is directed to a shape sensor for a cold rolling mill comprising a pair of shaped rolls over which a strip of metal under processing in a cold mill is passed during the rolling process wherein differences in strip tension are determined by measuring the forces from load cells supporting the ends of the shaped rolls, which are crowned, one roll being convex and the other roll being concave, and arranged and spaced to provide unique relationships between them whereby tension stresses in the strip are identified and measured in terms of force values of said load cells.

BRIEF DESCRIPTION OF THE DRAWINGS

FIG. 12 is a diagrammatic view of an application of the sensor mechanism to a metal processing mill, or the like.

DETAILED DESCRIPTION OF THE INVENTION

As has been previously pointed out, the control of shape in a metals rolling mill is not precisely understood; however, in order to present the features of the present invention certain reasonably confirmed concepts deserve consideration.

Figure 1:
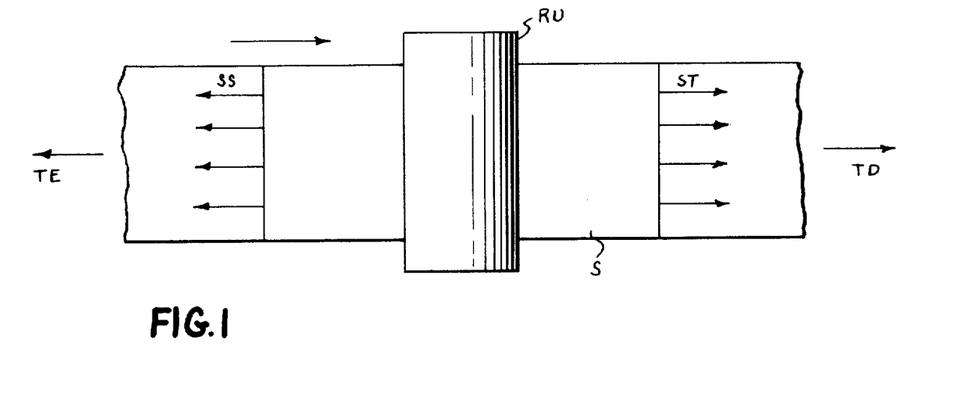
FIG. 1 is a diagrammatic plan view of a strip of metal in a rolling mill under uniform tension of the strip whereby each section of the strip is elongated evenly in the rolling process.
Figure 2:
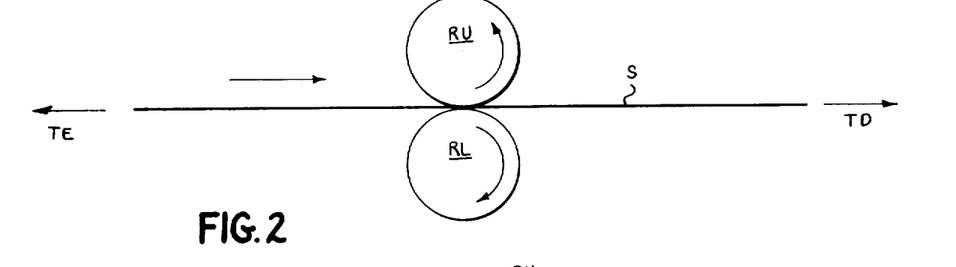
FIG. 2 is a front elevation view of FIG. 1.

The shape of a metal strip normally is affected more in a cold rolling process than in that of a hot strip mill, and it is understood that in the former process there is less reduction in gage and more changes in shape factors; i.e., flatness and thickness profile. The rolling process is considered to operate so that each section of the strip is elongated an equal amount under normal conditions as illustrated in FIG. 1 where a strip S passing under a roll RU and over a cooperating work roll RL (as shown in FIG. 2) is under uniform tension provided by the entry tension TE and the delivery tension TD, the tensions of the several sections of the strip being shown in FIG. 1 as SS and ST. This may be said to be the ideal case.

Figure 3:
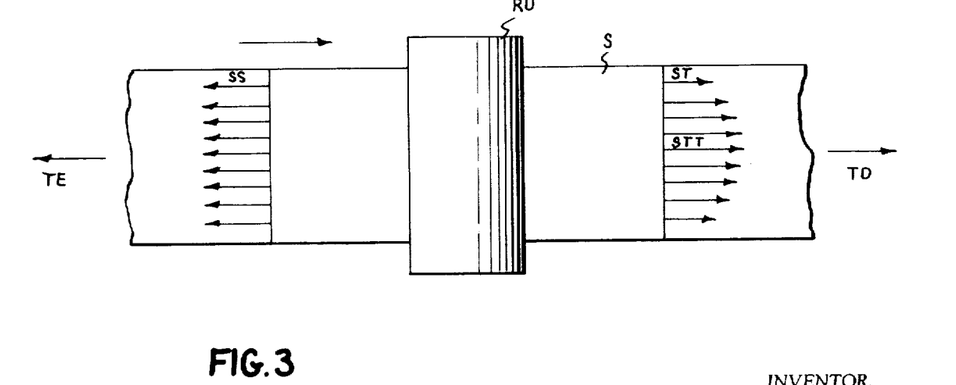
FIG. 3 is a diagrammatic view similar to FIG. 1 wherein the strip is subjected to uneven tensions, the tension at the edges of the strip being less than the tension in the center of the strip.
Figure 4:
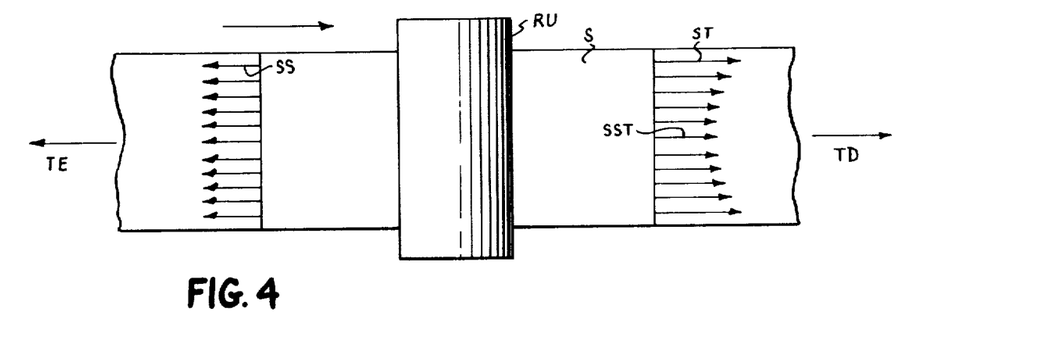
FIG. 4 is a view precisely converse to FIG. 3; that is, in FIG. 4 the strip is stressed greater at the edges than at its center.

Reference is now made to FIG. 3 which illustrates a situation where the work rolls (work roll RU being illustrated as the upper roll) tend to elongate the strip S more at its edges than at its center. In other words the tension at the center of the strip is greater than the tension at the edges of the strip since the strip S under these conditions is longer at its edges and the stress distribution becomes somewhat as shown by STT at the delivery end of the strip (FIG. 3). Calculations have shown that under conditions where the edges are 0.2 percent longer than the center of a strip the edge stress may be zero while the center has a stress of 60,000 pounds per square inch. Conversely, as illustrated in FIG. 4 if the tension is greater at the edges of the strip S than at the center (center of strip tending to become elongated more than the edges) the stress distribution will resemble the notation SST. In either event under these non-uniform stress conditions the strip will become either curled or buckled.

In cold rolling metals in multi-stand mills with parallel rolls in adjacent stands unequal tension across the strip width causes faulty shape. In order to control the process it is essential to determine and measure the discrepancy in shape. The present invention is directed to this feature and is briefly illustrated in FIG. 5. It is essentially a shape sensor in that it is capable of measuring total tension in the strip S, the difference in the tension between one side and the other, and/or the difference in tension between the center of the strip and either of the edges. Since shape is obviously proportional to non-uniform stress across the width of a strip of metal during a rolling process, if the tension differential between the center and the edges can be measured, the shape factor of the strip can be measured accordingly. Referring again to FIG. 5 there are shown four rolls over which a strip S passes under forward, or delivery tension TD, and entry tension TE Roll I and Roll IV have equal diameters and are uniform cylinders, Roll II is concave (see also FIG. 6) having a slight negative parabolic crown, and Roll III is convex having a slight positive parabolic crown. Rolls I and IV are rigidly supported; however, Rolls II and III are supported at each end by load cells (not shown) and are free to move vertically as required by the load cells.

Figure 5:
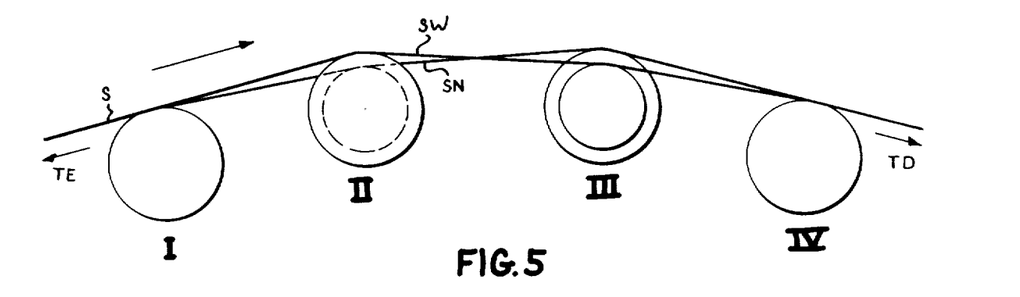
FIG. 5 is a diagrammatic view of the subject invention, showing the arrangement of the reference and crowned rolls forming the essential components of the shape control sensor mechanism.

As shown also in FIG. 5 the strip S passes over Roll II (concave roll) in such a manner that its center will conform to SN and its edges to SW. Similarly, but conversely, the strip passes over Roll III. All four rolls are of the same length (see FIG. 6), the maximum diameters of Rolls II and III being equal to the diameters of Rolls I and IV. It should be appreciated, however, that the maximum diameters of Rolls II and III need not always be equal to the diameter D of Rolls I and IV. The diameters of Rolls I and IV, however, customarily are equal (as illustrated in the drawings) while the maximum diameter of Roll II normally is equal to the maximum diameter of Roll III. In addition the rolls are arranged so that when the strip width equals the roll length and has equal tension across its width the total vertical forces on Rolls II and III will be equal. On the other hand, if the edges have more tension than the center of the strip, Roll II will have a greater vertical force exerted against it than Roll III. Conversely, if the center of the strip has more tension, Roll III will have a greater force exerted than Roll II. Differential tension between one side of the strip and the other side is measured by summing the force values of Rolls II and III (from the load cells) on one side of the strip S and comparing this sum with similar values obtained from the Rolls II and III on the other side of the strip S.

Figure 9:
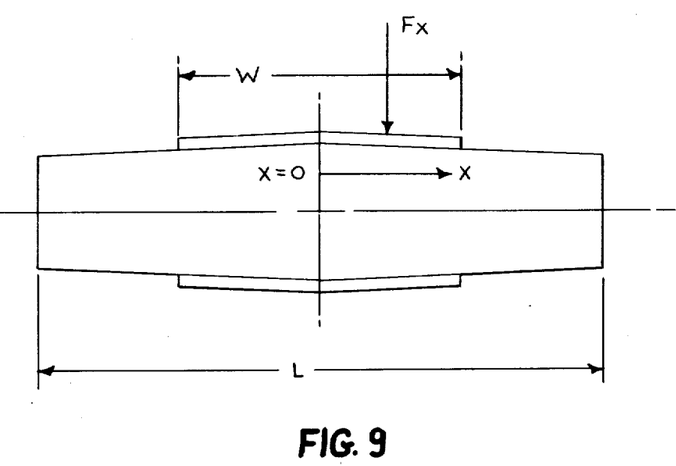
FIG. 9 is a further diagrammatic view similar to FIG. 8 in which the variation of the strip width is calculated for purposes of calibrating the sensor mechanism.

More explicitly, reference is again made to FIGS. 3 and 4, particularly the right side of the former (showing greater tension at the center of the strip S) and the right side of the latter (showing greater tension at the edges of the strip S). If, for purposes of illustration, the assumption is made that the tension profile is a continuous function symmetrical about the centerline of the strip S and that the tension profile approximates a parabolic function; then, $$T(x) = TC + 4(TE - TC)x^2/W^2$$

where:
  $W$ = Strip width
  $TC$ = Tension at center of strip
  $TE$ = Tension at edge of strip
  $T(x)$ = Strip tension at $x$ inches from center of strip (see FIG. 9)

Then, the average tension in the strip is:

$$T_{ave.} = \frac{2}{W}\int_0^{\frac{W}{2}}\left[TC + \frac{4(TE-TC)x^2}{W^2}\right]dx$$

Or, $$T_{ave.} = \frac{2}{3}TC + \frac{1}{3}TE$$

Figure 6:
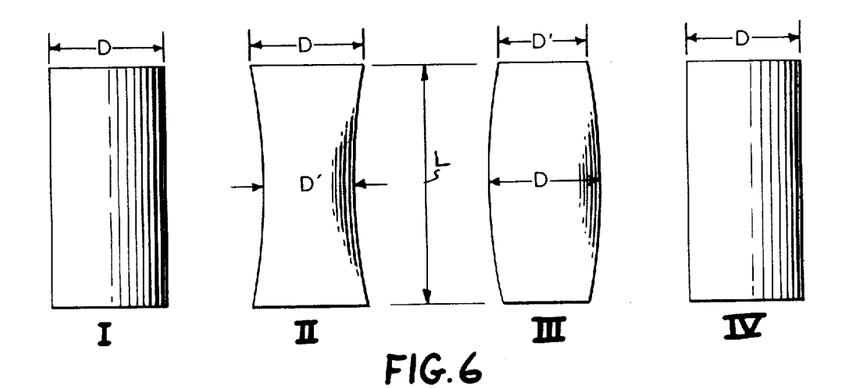
FIG. 6 is a plan view of FIG. 5, illustrating the necessary "crown" of the sensor rolls.
Figure 7:
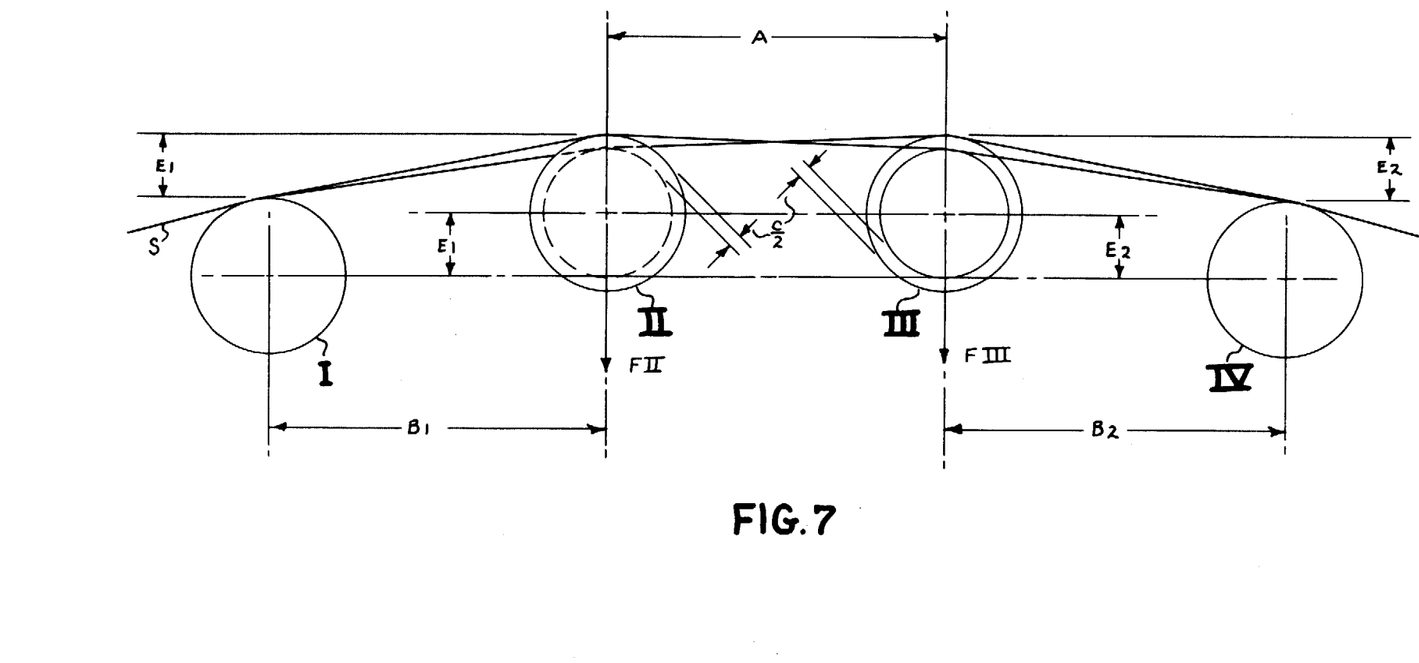
FIG. 7 is a diagrammatic view of the sensor mechanism first shown in FIG. 5, together with some of the underlying principles of functioning of the invention by way of illustration.

Reference is now made to FIG. 7, which is similar to FIG. 5, and also to FIG. 6. Rolls I and IV have flat surfaces, Roll II has a concave surface, and Roll III has a convex surface.

Let,
  $D$ = Maximum diameter of any roll
  $D'$ = Minimum diameter of any roll
  $C = D - D'$ = Crown of any roll
  $L$ = Length of any roll And let,
  $FII$ = Vertical force of Roll II (concave roll)
  $FIII$ = Vertical force of Roll III (convex roll) Force $FII$ is the total force measured by the load cells (not shown) at each end of Roll II, and Force III is the total force measured by the load cells (not shown) at each end of Roll III.

For illustrative purposes only, some further assumptions are made that:

Strip S makes line contact with all rolls.
Load cells (not shown) measure only a vertical force component.
Angles of strip deflection around rolls are slight and such that:

SIN $\theta$ approaches $\theta$

TAN $\theta$ approaches $\theta$

Strip conforms precisely to roll surface.
Roll crowns are parabolic.
Roll bearings are frictionless.
Strip exhibits no resistance to deformation passing over rolls.
Total deformation angle on all rolls is greater than ZERO.

Measured forces (FII and FIII) are perpendicular to pass line on Rolls II and III.

Strip center line remains true.

Referring again to FIG. 7, certain conclusions of statement become apparent in respect to the parameters shown:

WHEN, $A$ increases; FII decreases and FIII decreases.

$B_1$ increases; FII decreases.

$B_2$ increases; FIII decreases.

$E_1$ increases; FII increases.

$E_2$ increases; FIII increases.

$C$ increases; FII increases and FIII increases.

$E_1/B_1$ increases; FII increases.

$E_2/B_2$ increases; FIII increases.

$C/A$ increases; FII increases and FIII increases.

Figure 8:
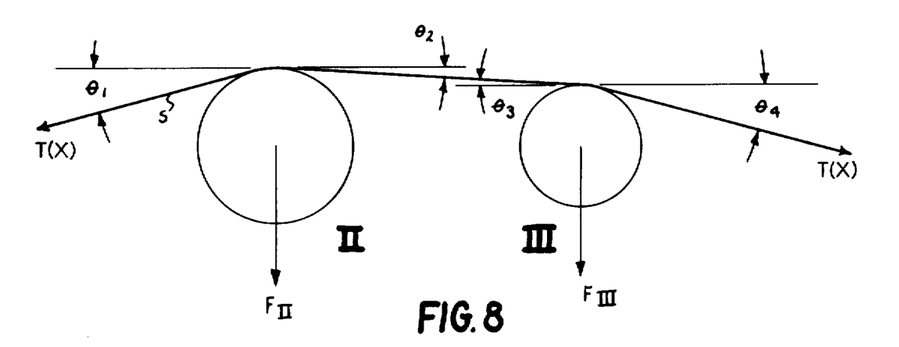
FIG. 8 is a diagrammatic view supporting an analysis of the operation of the invention.

Angular relationship of the strip $S$ in respect to the Rolls and II and III is shown in FIG. 8, the strip $S$ being under a tension of $T(x)$, it being noted that $x$ is the distance from the centerline of the strip $S$ whereat a vertical force $F_x$ acts upon the strip $S$ having an overall width $W$ (see FIG. 9). Hereinafter for clarity $T(x)$, $\theta(x)$, $F(x)$ etcetera are shown as $T$, $\theta$, etcetera; the understanding being that the reference or function of $x$ is included. Consequently, referring also to FIGS. 10 and 11, $$FII\, dx = T(\sin\theta_1 + \sin\theta_2)\, dx$$

$$FIII\, dx = T(\sin\theta_3 + \sin\theta_4)\, dx$$

Figure 10:
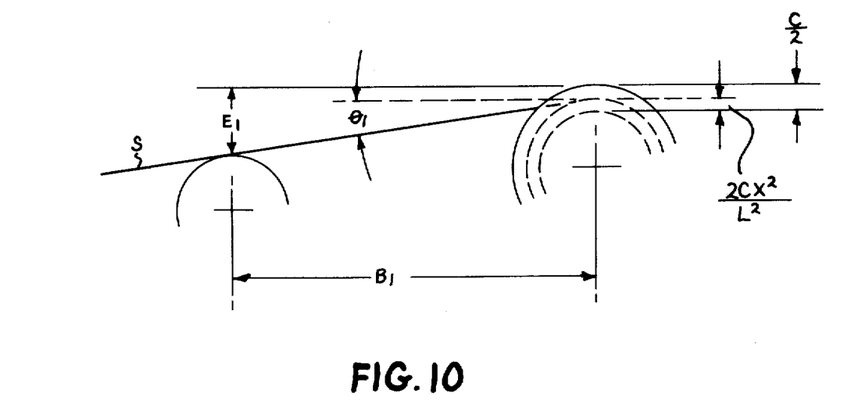
FIG. 10 is a further expansion of the diagrammatic view of FIG. 8.
Figure 11:
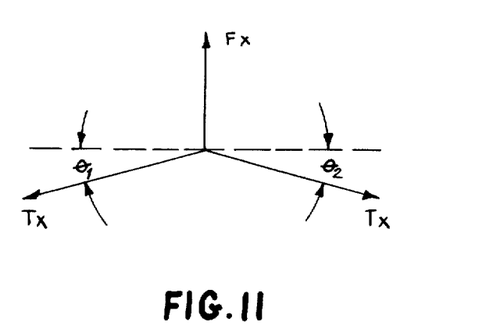
FIG. 11 is a detail of the mathematical concept discussed in connection with FIGS. 8, 9, and 10.

In addition, referring to FIG. 10, $$\tan\theta_1 = \frac{E_1 - \frac{C}{2} + \frac{2Cx^2}{L^2}}{B_1}$$

Therefore, $$\theta_1 = \tan^{-1}\left[\frac{E_1 - \frac{C}{2} + \frac{2Cx^2}{L^2}}{B_1}\right]$$

Similarly, $$\theta_2 = \tan^{-1}\left[\frac{\frac{4Cx^2}{L^2} - \frac{C}{2}}{A}\right]$$

$$\theta_3 = -\theta_2$$

$$\theta_4 = \tan^{-1}\left[\frac{E_2 - \frac{2Cx^2}{L^2}}{B_2}\right]$$

For small angular values $\sin\theta = \theta$, $\tan^{-1}\theta = \theta$, therefore, $\sin(\tan^{-1}\theta) = \theta$. FII the total force on Roll II, and FIII, the total force on Roll III, are $$FII = 2\int_0^{\frac{W}{2}} FII(x)\,dx \text{ and } FIII = 2\int_0^{\frac{W}{2}} FIII(x)\,dx$$

and substituting values for $\sin\theta_1$, $\sin\theta_2$, $\sin\theta_3$, $\sin\theta_4$, or their equivalents $\theta_1$, $\theta_2$, $\theta_3$, and $\theta_4$, upon integration the following obtains:

$$FII = W\left[\frac{1}{A}\left[\frac{(2TC+3TE)CW^2}{15L^2} - \frac{(2TC+TE)C}{6}\right]\right.$$
$$\left. + \frac{1}{B_1}\left[\frac{(2TC+3TE)CW^2}{30L^2} + \frac{(2TC+TE)(2E_1-C)}{6}\right]\right]$$

$$FIII = W\left[\frac{1}{A}\left[\frac{(2TC+TE)C}{6} - \frac{(2TC+3TE)CW^2}{15L^2}\right]\right.$$
$$\left. + \frac{1}{B_2}\left[\frac{(2TC+TE)E_2}{3} - \frac{(2TC+3TE)CW^2}{30L^2}\right]\right]$$

These total forces are therefore sensitive to the strip tensions and the placement of the rolls. Also, in order to have approximately equal force on both rolls (Rolls II and III) at full width strip and equal tension throughout the strip (where: $W=L$, $TC=TE$ and $FII=FIII$) the following dimensional relations are required.

$$E_1 = \frac{B_1 E_2}{B_2} + CB_1\left(\frac{1}{3A} - \frac{1}{6B_2} + \frac{1}{3B_1}\right)$$

And, if
$A = B_1 = B_2$
$E_1 = E_2 + C/2$ (See FIG. 7 for illustration.)

Figure 12:
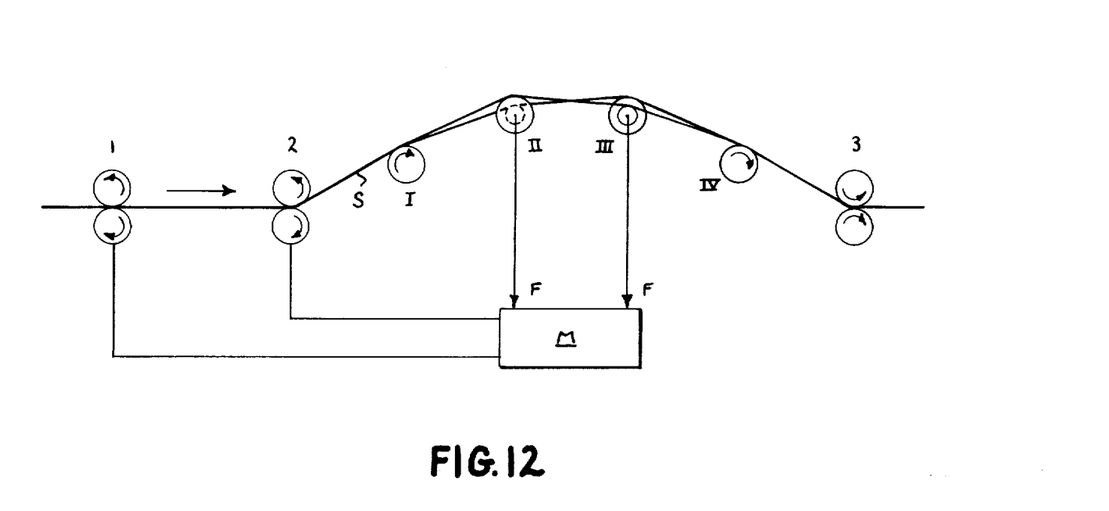

FIG. 12 illustrates the placing of an apparatus of the type described by FIG. 7 into a metals rolling mill between the second and third stands of the mill, for example, the strip passing through stands 1 and 2 where most of the reduction is taken and thereafter being measured by shape sensor apparatus delivering data to a central control M, which in turn has outputs to stands 1 and 2 for correcting the conditions at such stands responsible for the deviations in shape.

Figure 13:
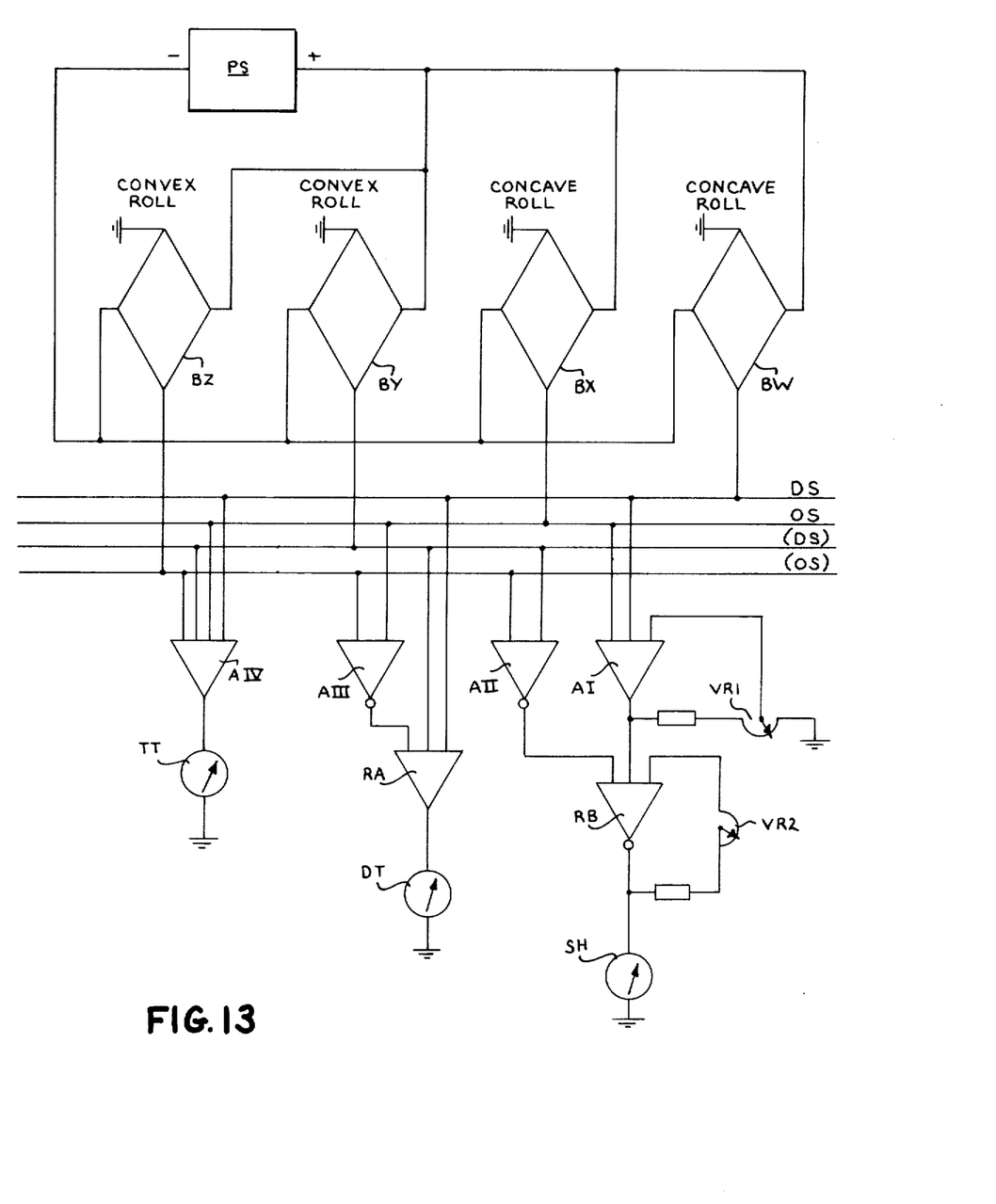
FIG. 13 is a diagrammatic electrical circuit arrangement for illustrating the resolution of the shape sensor in respect to the control of shape in a metal processing mill such as in FIG. 12.

FIG. 13 illustrates a measuring arrangement following along the lines suggested previously wherein four load cells, BW, BX, BY and BZ are attached respectively to the concave roll and the convex roll illustrated in FIG. 7. These load cells are energized via a power supply PS in such a manner that their outputs read force directly as voltages applied between lines DS, OS, (DS), (OS) and ground. The line OS may represent the operating side of the rolling mill for the concave roll sensor, the line (OS) representing the operating side of the convex roll of the shape sensors; and the lines DS and (DS) respectively, the corresponding drive sides of the shape sensor rolls. Connections are made to these lines by amplifiers AI and AII whose output is the sum of the forces on the concave and convex rolls respectively. The output of amplifiers AI and AII feed into another amplifier RB. Since the output of amplifier AI is opposite in sign to that of AII, the output of amplifier RB is the difference in the magnitudes of the force signals on the convex and concave rolls. The output of amplifier RB therefore goes into a readout meter SH calibrated to read shape factors. The potentiometer control VR1 is used for adjusting the gain of amplifier AI relative to AII for various strip widths. The potentiometer control VR2 is a calibrating device for adjusting the readout SH to recognize shape factors not assumed in the analysis. Similarly, amplifiers AIII and RA provide an output into a meter DT which indicates the differential tension across the strip of metal between the drive side and operating side of the rolling mill. An amplifier AIV connected with all of the lines and having an output into a meter TT allows a reading of the total tension in the strip. All of the meter reading SH, DT, and TT are in terms of forces derived from the load cells BW and BX in respect to the concave roll and BY and BZ in respect to the convex roll.

Attention is again directed to FIG. 13 and a simulated projection of the shape sensor apparatus, as listed in the tabulations set forth below for a typical multistand 80-inch cold rolling mill. Tabulation A sets forth values for high edge tension and "zero" centerline tension while Tabulation B sets forth the converse. For purposes of convenience the following legend is helpful in reading the tabulations:

$W$ = Strip width. (inches)
$FCVE$ = Total downward vertical force on concave roll. (pounds)
$FCXE$ = Total downward vertical force on convex roll. (pounds)
$EQTV$ = Total downward vertical force on concave roll w/strip tension constant at 3,250 pounds. (pounds)
$EQTX$ = Total downward vertical force on the convex roll w/strip tension constant at 3,250 pounds. (pounds)
$DFCV$ = Difference in force on concave roll vs convex roll between constant and parabolic strip tension profiles. (pounds)
$DFCX$ = Difference in force on convex roll vs concave roll between constant and parabolic strip tension profile. (pounds)

Referring to FIG. 13 and Tabulation A and considering the 24-inch strip width, it will be noted that signals from the concave roll are proportional to only 850.2 pounds for a constant profile and the gain of amplifier $AI = EQTX/EQTV = 2269.8/850.2 = 2.67$. Therefore, with a gain of 2.67 on amplifier AI, VRZ is adjusted so that amplifier RB will have "zero" output when equal tension exists on a 24-inch wide strip.

TABULATION A

| W | FCVE | FCXE | EQTV | EQTX | DFCV | DFCX |
|---|------|------|------|------|------|------|
| 80 | 7280.0 | 3120.0 | 5200.0 | 5200.0 | 2080.0 | −2080.0 |
| 77 | 6675.5 | 3334.5 | 4280.8 | 5189.2 | 1854.7 | −1854.7 |
| 70 | 5410.2 | 3689.8 | 4016.8 | 5083.2 | 1393.4 | −1393.4 |
| 60 | 3924.4 | 3875.6 | 3046.9 | 4753.1 | 877.5 | −877.5 |
| 50 | 2767.6 | 3732.4 | 2259.8 | 4240.2 | 507.8 | −507.8 |
| 40 | 1885.0 | 3315.0 | 1625.0 | 3575.0 | 260.0 | −260.0 |
| 30 | 1221.8 | 2678.2 | 1112.1 | 2787.9 | 109.7 | −109.7 |
| 24 | 906.4 | 2213.6 | 850.2 | 2269.8 | 56.2 | −56.2 |

Center Tension=0   Edge Tension=9750   Average Tension=3250
$A=10.0$   $B_i=10.0$   $B_r=10.0$   $E_i=.3$   $E_r=.2$   $C=.2$   $L=80$

TABULATION B

| W | FCVE | FCXE | EQTV | EQTX | DFCV | DFCX |
|---|------|------|------|------|------|------|
| 80 | 4160.0 | 6240.0 | 5200.0 | 5200.0 | −1040.0 | 1040.0 |
| 77 | 3893.5 | 6116.5 | 4820.8 | 5189.2 | −927.3 | 927.3 |
| 70 | 3320.1 | 5779.9 | 4016.8 | 5083.2 | −696.7 | 696.7 |
| 60 | 2608.1 | 5191.9 | 3046.9 | 4753.1 | −438.7 | 438.7 |
| 50 | 2005.9 | 4494.1 | 2259.8 | 4240.2 | −253.9 | 253.9 |
| 40 | 1495.0 | 3705.0 | 1625.0 | 3575.0 | −130.0 | 130.0 |
| 30 | 1057.3 | 2842.7 | 1112.1 | 2787.9 | −54.8 | 54.8 |
| 24 | 822.1 | 2297.9 | 850.2 | 2269.8 | −28.1 | 28.1 |

Center Tension=4875   Edge Tension=0   Average Tension=3250
$A=10.0$   $B_i=10.0$   $B_r=10.0$   $E_i=.3$   $E_r=.2$   $C=.2$   $L=80$ As has been indicated previously, shape is directly proportional to tension non-uniformly distributed in the strip of metal under processing. Total tension in all instances is a signal proportional to the sum of the outputs of all four load cells (FIG. 13) and differential tension across the width of the strip is derived by a comparison of the sum of the outputs of the load cells on one side (outside, for example) with the sum of the outputs of the load cells on the other side of the strip (inside, for example).

What is claimed is:
1. A shape sensor for strip material within a rolling mill wherein said strip material is passed between confronting rollers, said sensor including at least two rotatable rolls against which said strip is pulled to exert a force upon said rolls, said rolls contacting said strip material at longitudinally spaced locations along the flow path of said strip material in said mill, at least one of said rolls having a surface contour in contact with said strip material differing from the surface contour of the second of said rolls in contact with said strip material, said surface contour of said roll tending to deflect said strip material in a plane transverse to the flow path of the strip material in the mill, means for measuring the force of said strip material upon said rolls, and means for comparing said force measurements of one roll with the force measurements of another roll for determining the tension in said strip.

2. The invention of claim 1 wherein the profile of said contoured roll is concave.

3. The invention of claim 1 wherein the profile of said contoured roll is convex.

4. The invention of claim 1 wherein the profile of one said roll is concave and the profile of another said roll is convex.

5. The invention according to claim 4 wherein said concave and convex rolls are aligned between rolls of uniform profile over which the said strip is pulled.

6. The invention according to claim 5 wherein the said concave and said convex rolls are adjacent.

7. The invention according to claim 6 wherein the said concave and convex rolls are spaced equally from the said uniform rolls and from each other.

8. The invention according to claim 6 wherein the curve of the profile of the said concave and convex rolls is a parabola.

9. The invention of claim 1 wherein the measuring means is a load cell.

10. The invention of claim 1 wherein the measuring means includes a load cell at each end of one of said rolls.

* * * * *